March 31, 1970   J. C. KASTOVICH   3,504,161

OVEN

Filed April 26, 1966

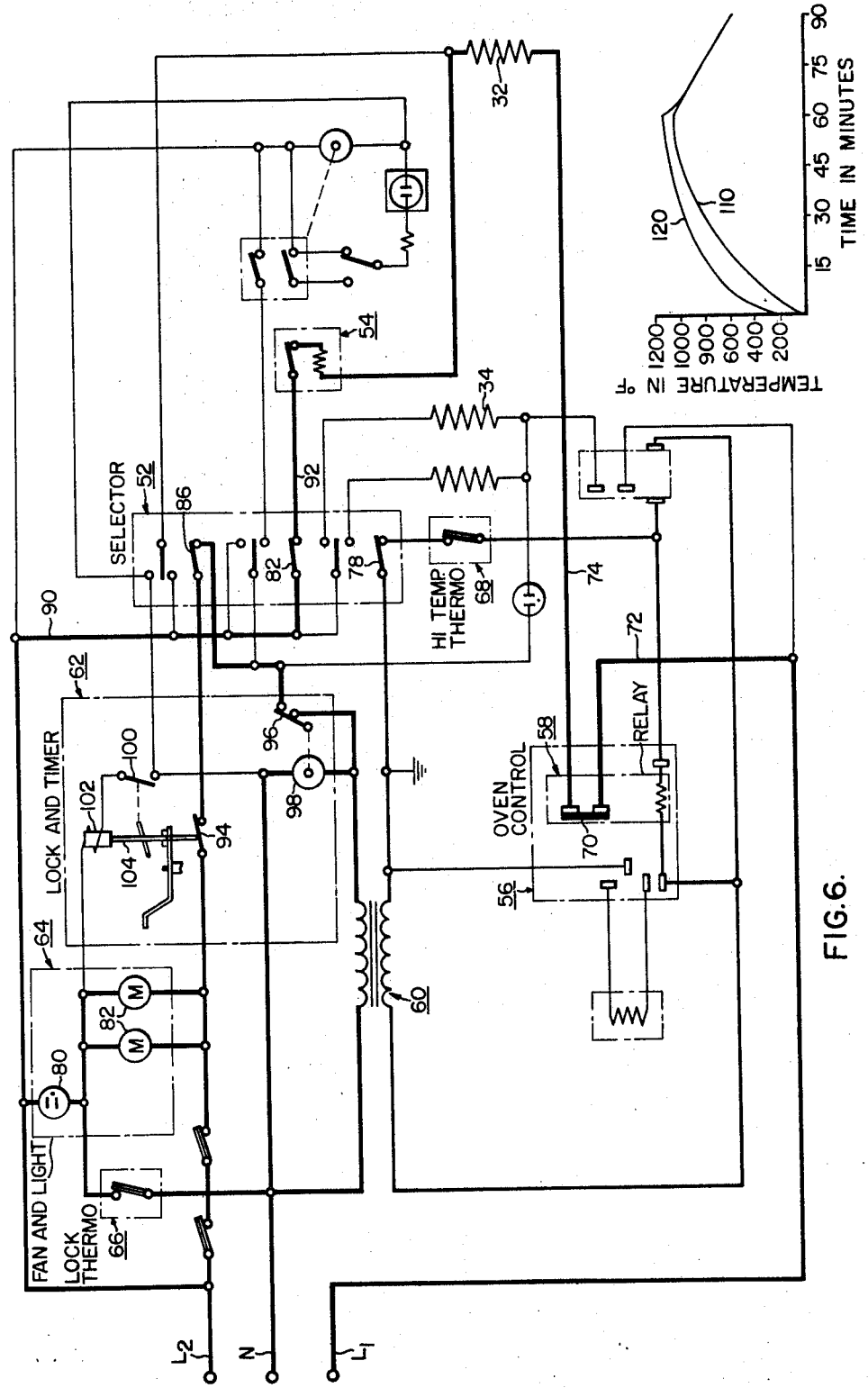

United States Patent Office 3,504,161
Patented Mar. 31, 1970

3,504,161
OVEN
John C. Kastovich, Franklin Township, Elmont, Pa., assignor to Westinghouse Electric Corporation, Pittsburgh Pa., a corporation of Pennsylvania
Continuation-in-part of application Ser. No. 521,932, Jan. 20, 1966. This application Apr. 26, 1966, Ser. No. 552,663
Int. Cl. A21b 1/22
U.S. Cl. 219—393    7 Claims

ABSTRACT OF THE DISCLOSURE

A cooking oven of the heat-cleaning type in which substantially all of the heat for cleaning is supplied by the upper (i.e., broiler) heating element energized to rapidly raise the oven cavity temperature into a heat-cleaning range, the broiler heating element also serving to eliminate smoke and fumes during heat cleaning by virtue of a venting system associated with the broiler element causing the smoke and fumes exiting from the oven cavity to flow closely by the element in passing into small apertures arrayed closely above the element.

This application is a continuation-in-part of my copending application, Ser. No. 521,932, filed Jan. 20, 1966.

This invention relates generally to ovens. It relates in particular to an arrangement for applying heat to an oven of heat-cleaning character and also relates to a smoke eliminator useful in eliminating smoke produced during broiling and certain other operations of the oven such as a heat cleaning operation.

Catalytic contact devices for eliminating and oxidizing smoke and cooking odors exiting from the oven are old. Frequently they are in the form of an adjunct to the oven and serve only in an eliminating and oxidizing capacity. In certain other arrangements a heating element for a cooking operation is used to provide the heat for associated catalytic means as well. An arrangement according to one aspect of this invention provides a simplified smoke eliminator arrangement in which a heating element for cooking and other operations serves directly in an eliminating capacity.

The gist of the invention, as viewed in connection with smoke elimination, is the provision of an electrical heating element in a location closely underlying the top wall of the oven provided with vent opening means arrayed to coincide with the array of the heating element. With this arrangement the heating element in addition to performing its normal heating function in certain operations of the oven will also provide a smoke eliminating function as the smoke and cooking odors sweep thereover and out of the vent opening means. It will be appreciated that the heating element location and direct exposure to the cavity lends itself well for conventional broiling. Additionally, the element may be used to provide all or substantially all the heating for heat cleaning of the oven while simultaneously serving as the eliminator of smoke and of the gaseous products of the pyrolytic decomposition of food soils in the oven.

That aspect of the invention involving the mode of applying heat to the oven cavity for a heat-cleaning operation will likely be found to be of at least equal significance in the practical art of self-cleaning ovens as the elimination aspect.

The self-cleaning domestic ovens currently on the market use, so far as I know, a number of heating elements energized at reduced wattage as the means for supplying heat for a heat-cleaning operation so that the temperature in the oven is raised into a heat-cleaning range rather gradually. For example, in one widely marketed oven of this kind, both the bake heater at the bottom of the oven cavity, and the broil heater at the top of the oven cavity, are energized to produce about one-fourth their rated wattage to raise the temperature in the cavity gradually to a maximum temperature of about 850° F. to 900° F. In such an arrangement, the heat transfer from the heating elements to the boundary surfaces of the cavity is effected to a substantial degree by convection. Some of the heat transfer is of course by way of conduction and radiation. However, it will be appreciated that a radiation effect for transferring heat is not used to a high degree since the temperatures of the elements are rather low at the reduced power input. In a way such an arrangement bears considerable resemblance to the conventional way of heating ovens to desired temperatures for a baking operation, the difference for a heat cleaning operation being that the heat energy is introduced for a much longer period. The reason others apply heat by way of several elements and relatively gradually may be based in part upon the belief that heating too rapidly will initially "bake" some food soils more tightly onto the surfaces, and in part upon the idea that more uniform heating of all of the surfaces may be better accomplished by providing heat at both the top and bottom of the cavity.

Regardless of the reasons others have for applying heat in a particular way for a heat cleaning operation, the mode in which I apply the heat differs in one way by taking advantage, to a greater degree, of the fourth power radiation effect in connection with both the transfer of heat and promoting uniformity of temperature of the boundary surfaces of the cavity. As is well known, for a radiating source with given surface characteristics, the rate of emission of energy per unit area depends principally upon the absolute temperature of the radiating source. This radiant flux density varies directly with the fourth power of the absolute temperature. Accordingly, my invention proceeds upon the premise that an adequate rate of heat transfer may be had from an essentially single heat emitting source energized to operate at a higher temperature than other's arrangements. Second, my invention involves the concept that the relatively higher temperatures (as compared to other's ovens) to which the various boundary surfaces of the oven as a whole are raised will in itself enhance the distribution of heat to obtain relatively uniform temperatures of all the boundary surfaces by the end of the energization part of the cleaning cycle. In that connection, while it might seem that the higher the temperatures in a cavity the greater the potential spread in temperature from one surface to another because of the greater capacity for tempertaure differences, the radiation effect increasingly opposes this temperature spread tendency as the temperature rises. Thus, adequate uniformity of surface temperatures is nicely achieved at even the high temperatures here involved.

Since the radiation effect is directly dependent upon temperature, an arrangement according to my invention requires concentrating the heat input to obtain the high temperature of the energized heat emitting source. The self-distributing effect (through radiation in part) requires heating substantially the entire cavity to a relatively high temperature. Finally, since obtaining the relatively high temperatures in the oven cavity requires that the heat energy input be substantially greater than the heat losses, the rate of energy input also becomes a factor. Hence, the mode of applying heat according to my invention includes using a concentrated heat source, applying heat energy at a relatively rapid rate, and sustaining the rate to achieve relatively high temperatures in the cavity.

In accordance with my preferred embodiment, substantially all of the heat is supplied to the cavity by heating overlying structure in the cavity at a relatively high rate. Thus at least the initial heat transfer from the upper structure must be mainly by way of radiation to cavity surfaces viewing the heated upper structure.

When electrical energy is used as the energy source, the top heating element, also used as a smoke eliminator as previously noted, is energized at a sufficiently high rate, relative to the rate at which heat is lost from the oven cavity, to heat the strucure overlying the caviy (which overlying structure includes both the element and cavity top wall structure) from normal ambient temperatures to a temperature above about 1000° F. within the relatively short perior of about 30–45 minutes. Preferably, large areas of the overlying structure of the cavity are maintained at a temperature between about 1000 and 1200° F. for a period of up to 30 minutes and the supply of heat is then terminated. The temperatures obtained by this mode of operation are consistent with maintaining the sheath surface of an electrical heating element supplying the heat in the proper temperature range to provide satisfactory smoke elimination.

Before passing to a somewhat more detailed description of structure for carrying out the invention, it is noted that the construction principles applicable to a conventional oven are also applicable in large part to an oven adapted for a heat cleaning cycle. That is, the oven cavity must be so arranged and sufficiently insulated to retain adequate heat for the intended operation while also incorporating structure which prevents the undue heating of exterior surfaces. Since the oven cavity in the heat cleaning operation is subjected to higher temperatures than used in conventional cooking operations, additional provisions are made to insure that the exterior parts of the structure do not exceed safe temperatures. These additions typically constitute additional insulation of perhaps better quality, and a more sophisticated arrangement for ventilation air flow past the surfaces which are to be cooled.

One currently preferred embodiment of the invention will be described in connection with the accompanying drawing, wherein:

FIG. 6 is a schematic diagram of one circuit arrangement for a heat-cleaning type range adapted to be operated in accordance with the invention; and FIG. 7 is a time-temperature graph illustrative of a typical heat-cleaning operation of a range incorporating the invention.

Figure 1:
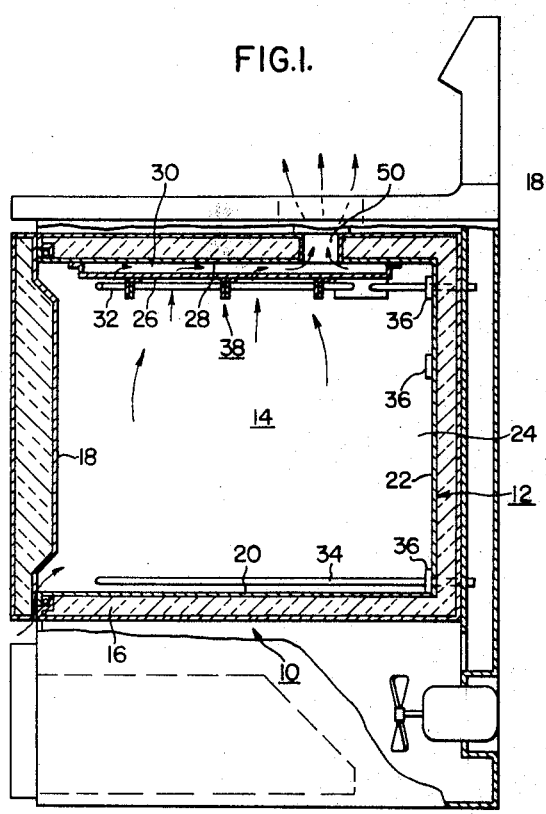
FIGURE 1 is a partly-schematic view in the nature of a side vertical section of a range of the heat-cleaning oven type incorporating the invention.

The oven shown in FIG. 1 is mainly formed of an outer shell 10 and an inner liner 12 generally defining the cooking cavity 14. Thermal insulation 16 is provided in the space between the liner and shell walls. The insulated door 18 at the front of the cooking cavity is usually placed in a closed position as shown for the operations with which this invention is concerned, but may be opened for access to the cooking cavity.

The liner includes a bottom wall 20, a rear wall 22, opposite side walls 24, and a double top wall assembly comprised of walls 26 and 28, The top walls are spaced apart vertically, except at their margins, to form an exhaust plenum 30 closely overlying the electrical heating element 32. The oven is also arranged to receive a lower heating element 34, normally energized for baking purposes, the elements 32 and 34 preferably being of the plug-in type with their terminal ends received by receptacles 36 at the rear wall 22 of the liner. The terminal ends are connected through a control circuit to a source of electrical power such as 236 volts as in conventional ovens. An intermediate height receptacle 36 may be used to receive an additional broiling element for simultaneously broiling opposite faces of the food article as disclosed in Filipak U.S. patent application 384,657, now U.S. Patent 3,440,402.

Figure 3:
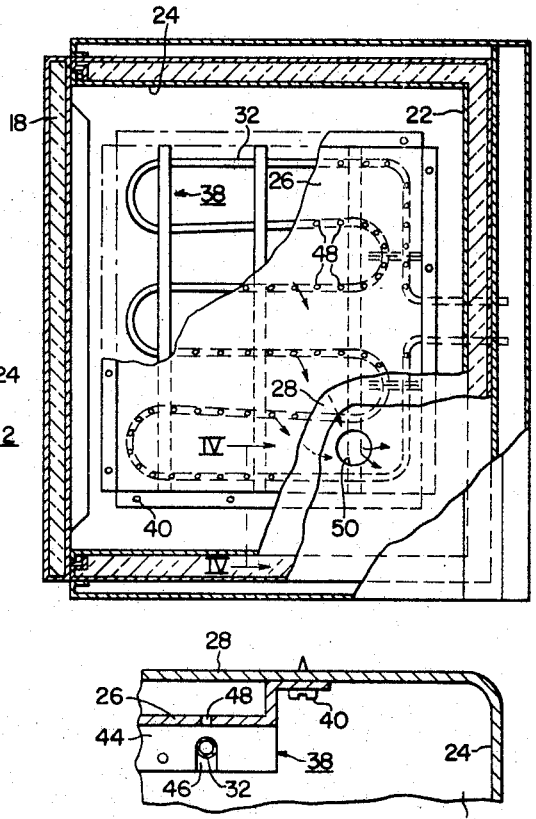
FIG. 3 is a partly-broken top view of the range.

The array presented by the top element 32 is shown as generally serpentine (FIG. 3) for purposes of example herein, although it will be appreciated that the element 32 may take other forms as dictated by design requirements not of concern here. The exhaust plenum 30 may conveniently be formed as a shallow, upwardly-open, pan-shaped assembly with its outwardly-flanged margins secured to the top wall 28 of the liner. The heater element 32 is supported directly below and from the extended area bottom wall 26 of the pan by means of stringers 38 which extend across the oven in front-to-rear spaced relation. Sheet metal screws 40 may be used to secure the margins of the pan-shaped assembly to the liner wall 28.

Figure 4:
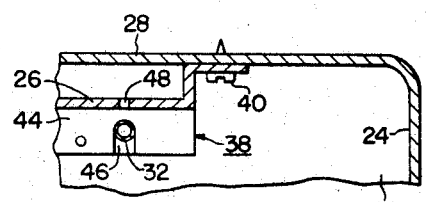
FIG. 4 is a fragmentary, enlarged, section corresponding to one taken along the line IV—IV of FIG. 3.
Figure 5:
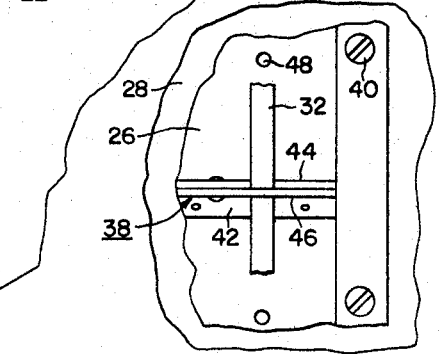
FIG. 5 is a face view of a fragment of the bottom of the eliminator structure and showing a currently preferred mounting arrangement of the heating element.

The serpentine element 32 shown has six front-to-rear passes in its length. Three cross stringers 38 are used to support the element from the pan bottom wall 26. Each stringer (FIGS. 3–5) includes an angle member 42 having one leg riveted to the wall 26, and the other leg depending therefrom with downwardly-open notches 44 disposed to receive the passes of the element 32. A strap 46 is then riveted to the depending leg to loosely close the notch and capture the element. The closed notches 44 are sufficiently aligned in a front-to-rear direction that the element may expand and contract as required in operation. The element 32, stringers 38, and pan form an assembly which may be installed and removed as an entity by simply disconnecting the element and removing the screws 40.

Figure 2:
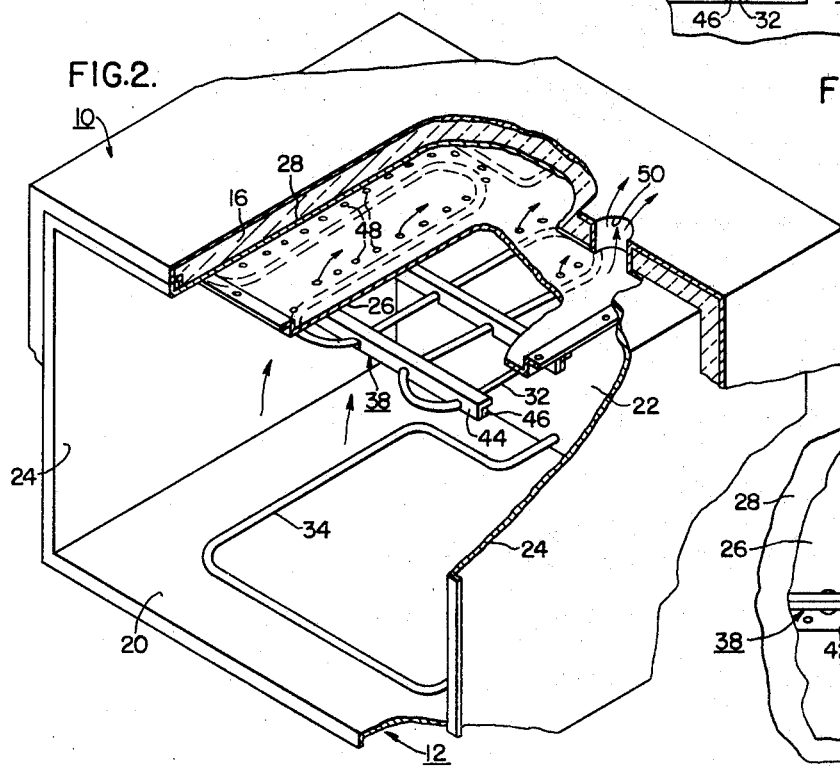
FIG. 2 is a partly-broken isometric view of an oven liner incorporating the invention.

In accordance with the invention, the bottom wall 26 of the exhaust plenum is provided with vent opening means, preferably in the form of a series of small apertures or ports 48 arrayed over the heating element 32. As an example of one satisfactorily operating arrangement, the ports are located directly above the element which in turn is spaced approximately ⅛ inch below the wall 26. About 100 circular ports of about 3/32 inch in diameter are found to perform well in one embodiment in a thirty inch domestic range oven. The oven cavity in such a range is typically about 20 inches wide, 18 inches deep and 15 inches high. A large number of relatively small holes is currently preferred to give good flow distribution for preventing overheating the element sheath, and to create turbulence around the sheath for intimate contact. The plenum 30 is provided with an exhaust opening 50 (FIGS. 1–2) in the wall 28 through which the carbon dioxide and water vapor resulting from the operation of the smoke eliminator exits up through a burner, or other opening, of the range in which the oven is incorporated.

In operation of the arrangement, broiling may often be carried out with the oven door substantially fully closed. The smoke and cooking odors produced during broiling are thereby forced to pass up into exhaust plenum 30 and out of the exhaust outlet 50. A suitable inlet such as a gap in the gasket along the lower edge of the door 18 is provided for the admission of makeup air. As the smoke sweeps over the relatively hot (i.e., about 1200–1500° F.) surface of the element 32, it is substantially fully burned to form carbon dioxide and water vapor which flows into and through the exhaust plenum.

Where the oven design is of the character permitting heat cleaning of the food soils in the oven by way of pyrolytic decomposition thereof, the heating element 32 can be used to both provide the relatively high temperature needed to accomplish the pyrolytic decomposition of the food soils, and also function to further oxidize the gaseous products produced by the pyrolytic decomposition. In both the broiling instance and in the heat cleaning example, the smoke elimination is accomplished in the same way. Suitable controls for energization of the element from a conventional electrical power source such as 236 volts are provided in both cases to accomplish the desired result.

One circuit arrangement which performs satisfactorily for carrying out the invention is shonw in FIG. 6. Principal attention will be directed to those parts of the circuit directly concerned with the heat-clean operation. The power circuit lines which are energized during operation in a heat-cleaning temperature range are shown heavy for contrast with the low voltage control circuit lines of medium weight and the light lines representing unenergized circuits. The circuits is shown in its condition corresponding to an oven temperature in the heat cleaning range but before cycling of the heating means occurs.

The conductor terminals L1, L2 and N provide the noted conventional power for the circuit. The components which perform particular functions are grouped together within dash-dot line rectangles in the drawing. The main assemblies thus shown include: the selector switch 52 which is a multi-position switch adapted to be manually positioned in accordance with the operation desired, this switch being shown in a "clean" position; a cycling switch assembly 54 which effects a cyclical energization of the element 32 during cleaning operation energization for purposes explained in copending Holtkamp application Ser. No. 531,858, filed Mar. 4, 1966, now U.S. Patent 3,440,-402; an oven temperature control generally designated 56 incorporating oven control relay means 58; a transformer 60 which includes a secondary winding connected to provide low voltage energization of the oven temperature control 56; a door locking assembly 62 which is operative to place the circuit in a condition permitting the start of a heat-cleaning cycle when the oven door is in a latched condition, to effect locking of the oven door as the oven temperature rises above a selected temperature, and to effect the termination later of the heat-cleaning operation; a ventilation fan and condition indicator assembly 64; a normally-open lock switch 66 responsive to oven temperature and operative to energize the elements of assembly 64 and shunt a part of the assembly 62 when the oven cavity temperature exceeds the selected temperature indicating the oven cavity temperature is being elevated beyond normally-encountered cooking temperature; and a normally-closed high temperature thermostat switch 68 which cycles the energization of the heating element on and off at the established upper limit of the cavity ambient temperature.

The oven temperature control assembly 56 may be of the general type described in U.S. Patent 2,962,575 and commonly called a King-Seely control. This control is incorporated in the illustrated circuit for operation in a heat cleaning cycle with the normally-open switch 70 of the control relay 58 actuated to a closed position connecting lines 72 and 74 when the relay is energized from the low voltage winding of the transformer 60. The oven control normally used to control energization of the relay in typical cooking operations is shunted out of the circuit by the series connected high temperature thermostatic switch 68 and the closed switch 78 of the selector during heat-cleaning.

The other switch elements of the selector 52 which are closed when the selector is in a "Clean" position are 82 and 86. Switch 82 completes a circuit between L2 and the cycle switch 54 with lines 90 and 92. Switch 86 completes a circuit which includes part of the door lock assembly 62 elements. The assembly 62 parts which must be in a particular position for a heat-cleaning operation to be carried out include a normally-open switch 94 which closes in response to the door latch being manually moved to a latched position when electrical power is available between N and L2, and the normally-closed switch 96 which opens after a period of operation of clock motor 98 when the door is latched. The assembly 62 also includes a normally-open solenoid switch 100 which is momentarily closed during a latching and unlatching operation to momentarily energize the solenoid 102 to shift the position of the lock pin 104 of the solenoid. The position of the pin 104 determinees whether locking of the oven door can occur, and whether switch 94 is closed.

When it is desired to carry out a heat cleaning operation, the door of the oven cavity is latched and the selector switch 52 is turned to a "Clean" position. Latching of the door causes switch 94 in the door lock assembly to close and completes a circuit through the transformer 60 primary, the timer switch 96, the selector switch 86, the switch 94, and connecting lines. Accordingly, the transformer primary is energized across about 118 volts. The secondary of the transformer is also energized and this causes switch 70 of the oven control relay to close. The top heating element 32 in the oven cavity is energized through the selector switch contacts 82 and 84 and the thermal cycling switch 54, which is typically set to be closed approximately 80% of the time. Accordingly, the heating element 32, which may be sized to produce 3400 watts at constant energization, will produce approximately 2700 watts average by virtue of the operation of the cycling switch 54. Such energization maintains the surface of the element 32 at a sufficiently high temperature to effect the elimination of smoke and other gaseous products generated as the temperature rises in the cavity to its upper limit, as well as supplying sufficient total heat to the oven cavity for a heat-cleaning operation.

When the air temperature in the oven cavity rises above above 500 or 550° F., the lock thermostat switch 66 closes to energize a neon indicator light 80 and ventilating fan means 84 shown as part of the assembly 64, and to shunt out solenoid 100 to effect locking of the oven door. Operation of the clock motor 98 for one hour, for example, causes switch 96 to open to terminate the supply of heat to the oven by deenergizing transformer 60 and thereby causing switch 70 in the oven control relay to open. During the one hour period the high temperature thermostatic switch 68 in series with the control relay 58 remains closed until a selected oven ambient temperature, such as 1025° F., is reached. Then switch 68 opens and closes in accordance with the oven cavity ambient temperature rising above, and falling below, the selected temperature. Experience has indicated that in a typical oven for a 30 inch range adapted for heat-cleaning operation with the proper insulation, and with means for providing ventilation of the range surfaces which must be maintained at reduced temperatures for purposes of safety, that the high temperature thermostatic switch 68 will typically cycle for say 10–20 minutes before the end of the one hour period. It will be appreciated that during the period the high temperature thermostatic switch 68 is cycling in response to temperature, the time dependent cycling switch 54 continues to cycle independently during the intervals the high temperature thermostatic switch 68 is closed.

When the timer actuated switch 96 opens after one hour the supply of heat to the cavity ends and the timer motor 98 is deenergized. The oven door may be opened after the oven cavity ambient temperature drops below the setting of the thermostatic switch 66 by manually unlatching the door.

FIG. 7 illustrates typical temperatures of cavity boundary surfaces and cavity air temperatures during a heat-cleaning operation. The curve 110 is a plot of representative surface temperatures measured on the bottom, sides, back, and door muffle, and of the cavity air temperature, at various times. The curve 120 is a plot of the surface tempeartures measured on wall structure 26 overlying the top heating element 32 at various times. While each curve is shown as a single line, it is to be understood that each represents the approximate mean of a band having a total temperature spread of about 25°–75° F., the spread changing with changing temperatures. The spreads are found to normally decrease as the application of heat continues and the temperature rises above a certain level, which is considered to demonstrate the self-distribution of the heat attained at higher temperatures through the radiation effect. In that connection it is noted that it may be expected that in a typical oven, during the period that the oven is at its highest temperature level, the spread between the temperatures as measured at central locations on the oven boundary surfaces of back, bottom, door muffle, sides and the oven air temperature, will be in the order of 20°–25° F.

It is to be understood that the curves are representative of the temperatures which may be expected to be encountered in a heat-cleaning operation in which no food soil is present in the oven cavity. When food soil is present in the cavity the temperatures indicated by the curves may be expected to be increased in accordance with the load of food soil. This is a result of the generation of heat produced by sporadic combustion of the food soil after the temperatures in the cavity reach a certain level.

It can be seen in FIG. 7 that the temperature of the top wall structure overlying the cavity is substantially higher than that of the other boundary surfaces throughout the entire period that heat is being supplied. With a temperature of, say, 100° F. of this top wall structure, rather than, say, 850° F., the radiant flux density is about doubled. At the start the difference between the top wall temperatures and other wall temperatures is more pronounced than near the end. This is likely to be partly due to initial heat transfer being effected mainly by radiation with a greater net emission from the top structure, whereas later the heated surfaces other than the overlying structure tend to promote convection currents, and also have higher values of radiant flux density because of their higher temperatures.

It may be seen from FIG. 7 that an oven incorporating an arrangement according to my invention is above a locking temperature for only about an hour and a half, and the overall cleaning time is considerably shortened with respect to those devices currently on the market which call for elevating the cavity temperature to a substantially lower temperature than is contemplated with my invention.

It is within the scope of that aspect of the invention relating to the way in which heat is applied and the temperatures and relevant time periods, that the smoke and gaseous products elimination be accomplished other than by means of the heating element 32. While not preferable from the standpoint of cost and other complicating factors, an independent smoke eliminating unit can be used and the single element 32 energized at a high level can be used solely for heating. However, it is greatly preferred that the heating element 32 also serve the function of an eliminator.

It is also within the scope of the invention that the mode of applying heat and effecting smoke elimination be carried out using a gas-fired burner source of heat. In that case, the burner would be located closely below a liner top wall formed of porous ceramic or fire brick type material. The heat from the burner flame is used to heat the top wall to temperatures of 1200°–1500° F., for example, which then serves as a highly effective radiant heat source also capable of smoke elimination.

It will of course be appreciated that those parts of the linear which are located closely adjacent the extremely hot elements 32 must be of a sufficiently heat and oxidation resistant material to withstand the operation. Accordingly, while some of the walls may be porcelain-enameled steel material for example, it is preferred that the pan wall 26 be of an oxidation resistant material such as aluminized steel when an electrically energized element is used as a heat source.

While the description has proceeded with an example of a currently preferred embodiment, it will be understood that certain variations can be made within the scope of the inventive concept. For example, with respect to the elimination aspect of the invention, the exhaust ports may take a more sophisticated form than simple openings, such as providing projections and vents to better channel the smoke into close proximity to the heating element. In addition, catalytic material such as platinum oxide or paladium oxide coated stainless steel may be associated with the heater and vent ports to increase the surface area of the heater, and to oxidize the smoke exiting thereby.

The advantages of the invention are manifold. The effectiveness of the elimination of both carbon monoxide and visual smoke is of a high order. The arrangement permits the incorporation of a smoke eliminator in a substantially conventional oven with little added cost to the structure. When the period of broiling does not cause overheating, the arrangement permits broiling to take place with the oven door closed and with the smoke produced being substantially eliminated by the arrangement. The arrangement as shown for use in smoke elimination also lends itself conveniently for incorporation in a heat cleaning type of oven and avoids the necessity of providing an independent catalytic contact device.

An additional advantage of the arrangement arising from the closed door broiling is that the smoke and other products produced during the broiling flow more directly out of the oven. That is, the relatively strong draft induced by the heating element does not permit the smoke to disperse about the oven interior, and the smoke is also prevented from flowing past substantial areas of the liner surface as occurs with the open door broiling. Accordingly, the oven liner remains cleaner.

Returning once more to that facet of the invention relating to the mode of applying heat to the cavity, it is noted that the structure overlying the major portion of the cavity encompasses both the heating element immediately below the top wall of the cavity, and large areas of the top wall itself. Both the element and these areas are effective radiant heat emitters because of the high temperatures. For example, most of the areas of the wall overlying the cavity will rise to a temperature of at least 1100° F. The radiant flux density of a surface at 1100° F. calculates at over half again as great as a surface at 900° F. The surface temperature of the electrically energized heating element 32 will average about 1400° F. The radiant flux density of a 1400° F. surface calculates at about three and a half times greater than a 900° F. surface. Hence the extent to which my invention takes advantage of the fourth power radiation effect through use of high temperatures will be appreciated.

What is claimed is:
1. In a cooking oven of the character adapted to have food stains therein pyrolytically decomposed for cleaning of said oven;
    liner means defining a cooking cavity and including a top wall;
    a door for substantially closing said cavity during a cleaning operation;
    heating element means for raising the temperature of said cavity into a heat-cleaning temperature range and maintaining said heat-cleaning temperature in said cavity to the effect said pyrolytic decomposition, said heating means including a heating element disposed in said cooking cavity to closely underlie said top wall;
    means for energizing said element during said heat-cleaning to produce a surface temperature of said element for promoting combustion of gaseous products passing closely by said element;
    said top wall including vent opening means closely adjacent said heating element and in an array generally coincident with the array presented by said heating element so that said gaseous products exit- ing from said cavity through said vent opening means are constrained to pass closely by said heating element so that said promotion of combustion is effected by said heating element directly;

said means for energizing said heating element includes means for controlling said energization at a level that said heating element alone produces sufficient heat to elevate the major portion of the surface areas bounding said cavity to a temperautre of about 1000° F. for said pyrolytic decomposition of food soils.

2. An oven according to claim 1 wherein:
said heating element presents a generally serpentine array; and
said vent opening means comprises a number of small, spaced apart apertures in an array immediately above said serpentine array of said heating element.

3. An oven according to claim 1 wherein:
said heating element is energized to operate with a surface temperature in a range of about 1200° to 1500° F.

4. An oven according to claim 1 wherein:
said heating element is in the form of a single, generally serpentine-shape, sheathed member; and
stringer means depending from said top wall are provided to support said heating element to permit relative movement therebetween to accommodate differential expansion and contraction.

5. The method of supplying heat to a cooking oven cavity for the purpose of heat-cleaning accumulated food soils from said cavity, comprising:
supplying substantially all of the heat for cleaning to structure overlying a major portion of the space defined by said cavity to heat said overlying structure rapidly to a tetmperature in a range having a lower limit of about 1000° F. by energizing a single heating element lying closely below the top wall structure generally defining the top wall of said oven cavity to heat said top wall struture substantially more rapidly than the said other surface areas bounding said cavity;
maintaining said temperature of said overlying structure for a sufficient period to elevate the temperature of the major portion of the surface areas bounding said cavity to a temperature of about 1000° F.; and
thereafter termniating said supply of heat;
said method further including energizing said heating element at a rate to produce a surface temperature of said element in a range of about 1200° to 1500° F.; and directing the gaseous products generated in said cavity during the heat-cleaning operation closely past said heating element surface in their passage from said cavity to substantially convert said products to an acceptable form.

6. The method according to claim 5 including:
supplying said heat to said overlying structure at a sufficiently high rate to elevate the temperature of substantially all of said overlying structure from normal ambient temperature to a temperature range above 1000° F. in about a 45 minute period.

7. In a cooking oven of the character adapted to undergo heat-cleaning of accumulated food solids from the liner of the oven cavity;
an upper heating element and a lower heating element in said cavity for normal use in a broiling and a baking operation, respectively;
control means for selectively energizing said elements for broiling and baking operations, and for energizing only said upper heating element to produce heat for a heat-cleaning operation at a sufficiently high rate to elevate the temperature of the major portion of the surfaces bounding said cavity to a temperature of about 1000° F. within about an hour;
said control means includes means for energizing said upper heating element at a rate to produce a surface temperature thereof in a range of about 1200° F. to 1500° F. during said heat-cleaning operation; and
vent opening means in the form of a number of relatively small, spaced-apart apertures arrayed to coincide with the array presented by said upper heating element and disposed closely thereby so that gaseous products exiting from said cavity through said vent opening means are constrained to pass closely by said heating element.

References Cited

UNITED STATES PATENTS

| 2,224,945 | 12/1940 | Ames | 219—391 |
| 2,729,735 | 1/1956 | Fries | 219—398 |
| 2,846,557 | 8/1958 | Schulze et al. | 126—21 X |
| 3,121,158 | 2/1964 | Hurko | 219—397 |

JOSEPH V. TRUHE, Primary Examiner

C. L. ALBRITTON, Assistant Examiner

U.S. Cl. X.R.

219—398, 406